United States Patent [19]
Hart, Jr. et al.

[11] Patent Number: 6,124,401
[45] Date of Patent: Sep. 26, 2000

[54] THERMOPLASTIC COATING COMPOSITIONS AND PROCESS USING SAME

[75] Inventors: Donald P. Hart, Jr.; Robert C. Stroup, both of Pittsburgh, Pa.

[73] Assignee: Ferro Corporation, Cleveland, Ohio

[21] Appl. No.: 08/043,062

[22] Filed: Apr. 5, 1993

Related U.S. Application Data

[63] Continuation of application No. 07/705,638, May 22, 1991, abandoned, which is a continuation-in-part of application No. 07/418,399, Oct. 6, 1989, Pat. No. 5,202,162.

[51] Int. Cl.⁷ .............................. C08F 8/15; C08L 63/02
[52] U.S. Cl. ........................................ 525/108; 528/106
[58] Field of Search .................................. 525/108, 221; 528/106

[56] References Cited

U.S. PATENT DOCUMENTS

| | | | |
|---|---|---|---|
| 2,748,093 | 5/1956 | Morris | 260/27 |
| 2,807,555 | 9/1957 | Short | 106/272 |
| 2,842,454 | 7/1958 | Short | 106/268 |
| 3,607,808 | 9/1971 | Thompson | 260/27 |
| 3,872,044 | 3/1975 | Hervey et al. | 260/30.8 R |
| 4,051,096 | 9/1977 | Koseki et al. | 260/31.8 M |
| 4,071,494 | 1/1978 | Gaylord | 260/42.14 |
| 4,367,113 | 1/1983 | Karim et al. | 156/327 |
| 4,433,073 | 2/1984 | Sano et al. | 523/201 |
| 4,454,379 | 6/1984 | Cleveland et al. | 174/107 |
| 4,603,172 | 7/1986 | Albee et al. | 525/143 |
| 4,789,699 | 12/1988 | Kieffer et al. | 524/271 |
| 4,803,117 | 2/1989 | Daponte | 428/228 |
| 4,870,128 | 9/1989 | Couturier et al. | 524/556 |
| 4,871,810 | 10/1989 | Saltman | 525/133 |

FOREIGN PATENT DOCUMENTS

| | | |
|---|---|---|
| 490471 | 12/1967 | Switzerland . |
| 1078827 | 8/1967 | United Kingdom . |
| 1133225 | 11/1968 | United Kingdom . |
| 1268418 | 3/1972 | United Kingdom . |

*Primary Examiner*—Robert Dawson
*Assistant Examiner*—D. Aylward
*Attorney, Agent, or Firm*—Rankin, Hill, Porter & Clark LLP

[57] ABSTRACT

This invention provides for a coating composition comprising: (A) at least one polymeric material selected from (i) at least one homopolymer of ethylene having a melt index of at least about 220 grams per ten minutes as determined by ASTM D1238, condition 190/2.16, or (ii) at least one copolymer of ethylene and a second ethylenically unsaturated monomer having a melt index of at least about 20 grams per ten minutes as determined by ASTM D1238, condition 190/2.16, or (iii) at least one thermoplastic acrylic homopolymer or copolymer having a glass transition temperature (Tg) of greater than 0° C. but less than 110° C., or (iv) a mixture of (i), (ii) and/or (iii); and (B) at least one thermoplastic polymeric material different than (A) having a melting point in the range of about 80° C. to about 130° C. and being miscible with (A) and wherein the viscosity of the polymer composition (A) and (B) is in the range of about 5,000 cps to about 100,000 cps at a temperature range of about 200° F. to about 300° F. The invention further provides for a process for applying the foregoing coating composition to a substrate such as glass, ceramic, metal, fiberboard, textile or plastic substrate (e.g., glass jars or bottles) preferably using hot melt screen printing; the process employs a low-temperature cure that requires only a relatively brief cure time (e.g., less than about one second). The coating composition can be reheated to obtain higher gloss and/or enhance the adhesion of the coating to the substrate.

3 Claims, No Drawings

6,124,401

THERMOPLASTIC COATING COMPOSITIONS AND PROCESS USING SAME

RELATED APPLICATIONS

This application is a continuation of application Ser. No. 07/705,638 filed May 22, 1991, now abandoned, which is a continuation-in-part of application Ser. No. 07/418,399 filed Oct. 6, 1989 which issued as U.S. Pat. No. 5,202,162.

TECHNICAL FIELD

This invention relates to thermoplastic coating compositions and to screen processes using said compositions.

BACKGROUND OF THE INVENTION

The decoration of ceramic surfaces by the so-called silk screen process is well established. A screen of fine metal wires is used in which selected areas of the screen are blocked or masked so as to pass through the screen a decorating ink or paint in a predetermined pattern only, the pattern defining the print to be deposited on the ceramic. This practice has encountered a number of problems arising in particular with the demands of ever increasing speed in screen application, multi-color screen printing, and economic considerations in screen-printing disposable or throwaway containers.

For many years screen printing of glass such as glass enamel, has been carried out by dispersing a pigment and ground vitreous frit in a liquid vehicle, such as a viscous oil, squeegeeing the dispersion through a masked screen onto the glass surface, and then firing the glass to drive off the organic constituents of the dispersion and fix the pigment to the glass surface. When the speed requirements of screen printing are not great and/or highly durable, fired prints are desired, this process is quite satisfactory. There are disadvantages with this process, however, when multi-color, superimposed or adjoining prints are desired. In these cases, each screening operation must be followed by air-drying and hardening steps, often involving oven equipment, before a succeeding screen application can be made on the same glass ware, followed in turn by still additional drying prior to screen application of another color, etc., in order to prevent smearing and blending of one color into another before the ware is ultimately fired at a relatively high temperature, for example, 1200° F.

To eliminate the necessity for a drying operation after each screen printing, particularly in multi-color applications, hot melt or thermo-fluid ceramic inks have been developed. These inks typically comprise a thermoplastic vehicle and a glass binder. They are solid at the temperature of the ware to be printed (normally room temperature) and become fluid and therefore flowable when heated to a higher temperature. In the fluid condition, thermo-fluid ceramic inks are forced through a screen in the usual manner onto a substrate to be printed where they solidify almost instantly because of the relatively low temperature of that substrate. These inks may be maintained in a fluid condition either by radiant heat or by passing an electric current through the wires of the screen.

In order to function properly, such thermo-fluid ceramic inks must have certain physical properties. Thermo-fluid ceramic inks must melt quickly within a narrow temperature range without substantial physical or chemical change; they must not run after application to a surface; and they must level properly before solidifying. If the thermo-fluid ceramic ink has insufficient fluidity, tiny pinholes result in the design left by the screening operation. The pinholes later enlarge during a firing operation and permanently detract from the appearance of the printed design. Pinholes also tend to promote bleeding of subsequently screened colors into other colors during the time required for the subsequently screened colors to solidify.

Other requirements for a satisfactory thermo-fluid ceramic ink include good adherence to ceramic, metal or glass surfaces; avoidance of gelation when in a molten condition; stability over prolonged periods of time; moisture-resistance; ability to be fired without leaving objectionable carbon deposits; and, where required, the ability to meet various hot alkali tests.

In view of these essential and sometimes diverse specifications, difficulty has been met in producing thermo-fluid ceramic inks that meet all these requirements and that are uniformly suitable for various screen applications. Previously, the art has found it necessary to compound thermo-fluid inks from a fairly large number of components in order that the inks have as many as possible of the listed desired physical properties. One or more natural waxes in combination with one or more natural resins in combination with still other ingredients have been suggested. For example, U.S. Pat. No. 2,748,093 discloses a vehicle suitable for the application of enamel by a screen process, the vehicle comprising diphenyl, hydrogenated rosin, an ethylene glycol ester of hydrogenated rosin, a diethylene glycol ester of hydrogenated rosin, and polybutene. U.S. Pat. No. 2,807,555 discloses a thermo-fluid vehicle comprising a mixture of the reaction product of stearic acid and an aliphatic amine, a natural vegetable wax, polyethylene glycol, and optionally a phosphorated tall oil. U.S. Pat. No. 2,842,454 discloses a thermo-fluid vehicle comprising paraffin, natural vegetable wax and aluminum stearate.

The use of known thermo-fluid ceramic inks has not always achieved entirely satisfactory results in multicolor screen printing because of damage to previous prints from the heat of succeeding screen applications. For example, screen markings from one screen application can appear on the print of a preceding screen application. Or alternatively, a succeeding screen application can pick-off or lift-off part of the print of a previous screen application.

Moreover, the increasing use of disposable, nonreturnable containers has introduced a further cost consideration. In addition to the foregoing requirements, an ink used for screen printing, either for single or multicolor printing, must also be relatively inexpensive for application to containers designed to be thrown away after a single use.

It is known to use a thermo-fluid ink containing a low-density polyethylene having a melt index of 200 grams per ten minutes as determined by ASTM D1238, a polyterpene resin, wax, pigment and fillers to decorate a plastic substrate.

U.S. Pat. No. 3,872,044 discloses thermo-fluid ink adapted for application by a screen process to ceramic, metal or plastic ware, the ink comprising a solid thermoplastic polyamide resin formed by reacting a dicarboxylic acid, such as a dimerized fatty acid, with a linear diamine such as hexylmethyldiamine. The solid polyamide has a molecular weight or can be plasticized with a sufficient amount of a compatible plasticizer to have a melting point within the range of about 85° C. to about 120° C. The ink also includes a sufficient amount of a pigment to impart color or opacity, and can include an organo silane.

SUMMARY OF THE INVENTION

This invention provides for a printable coating composition for forming a decorative coating on substrate comprising: (A)(i) at least one homopolymer of ethylene having a melt index of at least about 220 grams per ten minutes as determined by ASTM D1238, condition 190/2.16, or (ii) at least one copolymer of ethylene and a second ethylenically unsaturated monomer having a melt index of at least about 20 grams per ten minutes as determined by ASTM D1238, condition 190/2.16, or (iii) at least one thermoplastic acrylic homopolymer or copolymer having a glass transition temperature (Tg) of greater than OeC but less than 110° C., or (iv) a mixture of (i), (ii) or (iii); and (B) at least one thermoplastic polymeric material different than (A) having a melting point in the range of about 0° C. to about 130° C. and being dispersible with (A) wherein the polymer composition of (A) and (B) is normally solid at room temperature but is a viscous liquid at about 200° F. to about 300° F. with a viscosity in the range of about 5,000 cps to about 100,000 cps. At least one of the (A) polymeric materials should be capable of melt flow upon heating.

The invention further provides for a process for applying the foregoing coating composition to a substrate and the resultant coated articles such as glass, ceramic, metal, fiberboard, textile or plastic (e.g., glass jars or bottles) preferably using hot melt screen printing; the process employs a low-temperature cure that requires only a relatively brief cure time (e.g., less than about one second). Specifically, the process comprises:

(1) heating the composition of claim 1 to a temperature in the range of about 70° C. to about 135° C.; and (2) applying said composition to said substrate.

The coating composition can be reheated to obtain higher gloss and/or enhance the adhesion of the coating to the substrate. Moreover, the coating composition of the present invention may be substantially solvent-free and thus avoid the handling, processing and environmental problems associated with commercial coatings and inks which require a solvent.

Still further according to the present invention, a printable, substantially solvent-free coating composition for forming a decorative coating on a substrate is provided and comprises:

(A) at least one copolymer of ethylene and a second ethylenically unsaturated monomer having a melt index of at least about 20 grams per ten minutes as determined by ASTM D-1238, condition 190/2.16; and (B) at least one thermoplastic polymeric material different than (A) having a melting point in the range of about 80° C. to about 130° C. and being miscible with (A).

Still further according to the present invention, a printable, substantially solvent-free coating composition for forming a decorative coating on a substrate is provided and comprises:

(A) at least one thermoplastic acrylic copolymer having a glass transition temperature (Tg) of greater than 10° C. but less than 110° C., and (B) at least one thermoplastic polymeric material different than (A) having a melting point in the range of about 80° C. to about 130° C. and being miscible with (A).

Still further according to the present invention, a printable, substantially solvent-free coating for forming a decorative coating composition on a substrate is provided and comprises:

(A) at least one ethylene-vinyl acetate copolymer having a melt index of at least about 20 grams per ten minutes as determined by ASTM D-1238, condition 190/2.16, and a vinyl acetate content in the range of up to about 60% by weight; and (B) at least one polyterpene or aromatic modified polyterpene having a melting point in the range of about 80° C. to about 130° C.

In summary, applicants' invention resides in developing a specific formulation of very specific components having specific physical properties to provide a printable, e.g., silk screenable, coating composition for specific substrates that overcomes the problems of the coatings now being used in the industry and provides coatings having properties and applicability which has not yet been achieved in the art.

DESCRIPTION OF THE PREFERRED EMBODIMENTS

The inventive coating compositions may be referred to as hot melt polymer decorations. The coatings of the present invention may be protective to the substrate as well as decorative. In addition to the homopolymer or copolymer (A) and the thermoplastic polymeric material (B), referred to above, these coating compositions can optionally include one or more pigments (C), waxes (D), silicone polymers (E), fluorocarbons (F), plasticizers (G), surfactants (H), organosilanes (I), adhesion promoters (J) and dyes and/or fillers.

The polyethylene homopolymers (A)(i) preferably have melt indexes of at least about 220 grams per ten minutes as determined by ASTM D1238, condition 190/2.16. The melt indexes for these homopolymers are more preferably in the range of about 250 to about 2500, and more preferably about 250 to about 500, more preferably about 300 to about 400 grams per ten minutes as determined by the foregoing ASTM test method. These homopolymers preferably have densities in the range of about 0.90 to about 0.96 gms/cc. Examples of commercially available polyethylene homopolymers that are useful include Petrothene NA601-00/04 (a product of Quantum Chemical identified as a polyethylene homopolymer having a melt index of 2000 grams per ten minutes as determined by ASTM D1238, condition 190/2.16, and a density of 0.903 gms/cc), and Petrothene NA598-00 (a product of Quantum Chemical identified as a polyethylene homopolymer having a melt index of 400 grams per ten minutes as determined by ASTM D1238, condition 190/2.16, and a density of 0.916 gms/cc).

The copolymers (A)(ii) that are preferred include copolymers of ethylene with vinyl acetate, methyl acrylate, ethyl acrylate, butyl acetate, acrylic acid, methacrylic acid, and metal salts of acrylic acid and methacrylic acid. These copolymers preferably have melt indexes of at least about 20 grams per ten minutes as determined by ASTM D1238, condition 190/2.16. The melt indexes for these copolymers are more preferably in the range of about 20 to about 2500, more preferably about 20 to about 500 grams per ten minutes as determined by the foregoing ASTM test method. These copolymers preferably have densities in the range of about 0.90 to about 0.96 gms/cc.

The ethylene-vinyl acetate copolymers (A)(ii) that are useful with the inventive coating compositions have a vinyl acetate contents that preferably range up to about 60% by weight, more preferably about 5% to about 60% by weight, more preferably about 5% to about 52% by weight, more preferably about 25% to about 35% by weight. In one embodiment of the invention copolymers having vinyl acetate contents preferably in the range of about 6% to about 40% by weight are useful. In another embodiment, copolymers having vinyl acetate contents in the range of about 40% to about 52% by weight are useful. The melt index is preferably at least about 20 grams per ten minutes, more preferably about 20 to about 2500 grams per ten minutes, more preferably about 20 to about 500 grams per ten minutes. In one embodiment of the invention the melt index is in the range of about 20 to about 200 grams per ten minutes. In another embodiment the melt index is in the range of about 300 to about 400 grams per ten minutes. In another embodiment, mixtures of ethylene vinyl acetate copolymers are employed wherein at least one copolymer has a melt index in the range of about 20 to about 100 grams per ten minutes, and another has a melt index in the range of about 300 to about 400 grams per ten minutes. The foregoing melt indexes are determined using ASTM D1238, condition 190/2.16. Examples of commercially available ethylene-vinyl acetate copolymers that are useful include Elvax 220 (a product of DuPont identified as having a melt index of 150 and a vinyl acetate content of 28% by weight), Elvax 3185 (a product of DuPont identified as having a melt index of 43 and a vinyl acetate content of 33% by weight), Elvax 3180 (a product of DuPont identified as having a melt index of 25 and a vinyl acetate of 28% by weight), Ultrathene UE 654-35 (a product of Quantum Chemical identified as having a melt index of 48 and a vinyl acetate content of 33% by weight), Ultrathene UE 653-35 (a product of Quantum Chemical identified as having a melt index of 388 and a vinyl acetate content of 28% by weight), and Vynathene E 902-35 (a product of Quantum Chemical identified as having a melt index of 70 and a vinyl acetate content of 40% by weight).

The ethylene-methyl acrylate copolymers (A)(ii) preferably have methyl acrylate contents of up to about 40% by weight, more preferably about 20% to about 40% by weight. The ethylene-ethylacrylate copolymers preferably have ethyl acrylate contents of up to about 30% by weight, more preferably about 15% to about 30% by weight. The ethylene-acrylic acid and ethylene-methacrylic acid copolymers preferably have acrylic acid and methacrylic acid contents, respectively, of up to about 20% by weight, more preferably about 3% to about 20% by weight. Examples of useful ethylene-methacrylic acid copolymers include Nucrel 535 (a product of DuPont identified as having a melt index of 32 grams per ten minutes as determined by ASTM D1238, and a softening temperature of 75° C. as determined by ASTM D1525, rate B) and Nucrel 599 (a product of DuPont identified as having a melt index of 500 grams per ten minutes as determined by ASTM D1238, and a softening temperature of 65° C. as determined by ASTM D1525, rate B).

The metal salts of ethylene-acrylic acid and ethylene-methacrylic acid that are useful as copolymers (A)(ii) can be referred to as ionomers. These ionomers are typically neutralized salts of such copolymers, the metals preferably being sodium, lithium, barium, magnesium, zinc or aluminum, with sodium and zinc being particularly preferred. Commercially available ionomers that are useful are marketed by DuPont under the trade name "Surlyn A".

The thermoplastic acrylic polymers A(iii) that are preferred for the purposes of the present invention include homopolymers and copolymers of acrylate eater monomers, for example, methyl acrylate, ethyl acrylate, methyl methacrylate, ethyl methacrylate, propyl acrylate, butyl acrylate, ethylhexyl acrylate, butyl methacrylate, isobutyl methacrylate and the like. The acrylate copolymers may be derived from a minor amount, i.e., less than 40 percent by weight of the monomers, of a monomer other than an acrylate ester. The acrylate copolymer is derived from a major amount, i.e., 60% by weight or greater of the total weight of the monomers, of at least one acrylate ester monomer. Among the preferred other monomers, there may be mentioned styrene, acrylic acid, methacrylic acid, maleic anhydride, maleic acid, itaconic acid, alpha methyl styrene, and the like may be employed. The foregoing listing of monomers is provided for illustrative purposes only and it is not intended to be exhaustive of all possible monomers useful for the preparation of the acrylic polymers. Examples of commercially available thermoplastic acrylic polymers are acrylate copolymers available under the ACRYLOID® Trademark (ACRYLOID® B-82 is a product of Rohm & Haas and is identified as an ethyl methacrylate copolymer having a glass transition temperature (Tg) of 40° C.), NEOCRYL® solid acrylic resins which are products of ICI Resins U.S. and ELVACITE® which are also solid acrylic resins sold by DuPont. The thermoplastic acrylic polymer according to the present invention preferably has a glass transition temperature (Tg) of greater than 0° C. but less than 110° C.; more preferably of greater than 10° C. but less than 100° C.; and most preferably of greater than 25° C. but less than 75° C. In other words, the thermoplastic acrylic polymers are formulated such that they have sufficient melt flow properties at the desired printing temperatures for the coating compositions of the present invention.

The homopolymers (A)(i), copolymers (A)(ii) and thermoplastic acrylic polymers (A)(iii) are preferably present in the inventive coating compositions at concentrations in the range of about 10% to about 50% by weight, more preferably about 15% to about 25% by weight based on the total weight of such coating compositions. Mixtures of one or more homopolymers (A)(i) with one or more copolymers (A)(ii) and/or with one or more thermoplastic acrylic polymers (A)(iii) are useful.

The thermoplastic polymeric material (B) may be any thermoplastic resin that has a melting point in the range of about 0° C. to about 130° C., more preferably about 60° C. to about 130° C., most preferably about 100° C. to about 125° C., and is miscible/dispersible with the (A) polymer, e.g., an ethylene-vinyl acetate copolymer, used in accordance with the invention. The thermoplastic material (B) can be a thermoplastic resin that is modified by the addition of plasticizers or other conventional additives to achieve the desired melting point and/or miscibility. Examples of useful thermoplastic resins include polyterpene resins, aromatic-modified polyterpene resins, polyester derived from pentaerythritol and rosin acid, polystyrene, poly(alpha-methyl styrene), acrylonitrile-butadienestyrene, acetal, acrylic, cellulosic, chlorinated polyether, diallyl phthalate, phenoxy, polyamides, polycarbonates, polyethylene, polypropylene, polyvinylchloride, etc. Mixtures of two or more of the foregoing resins can be used. Preferred resins are polyterpene resins, aromatic-modified polyterpene resins, polyesters derived from pentaerythritol and rosin acid, polystyrene and poly(alpha-methyl styrene). Examples of commercially available thermoplastic materials that are useful include Zonarez 7110 (a product of Arizona Chemical identified as a polyterpene having a softening point of 100° C.), Zonarez 7115 (a product of Arizona Chemical identified as a polyterpene having a softening point of 115° C.), Zonarez 7125 (a product of Arizona Chemical identified as a polyterpene having a melting point of 125° C.), Piccolyte HM105 (a product of Hercules identified as an aromatic-modified terpene resin having a melting point of 105° C.), Kristalex 3100 (a product of Hercules identified as a poly(alpha-methyl styrene) having a melting point of 100° C.), and Sylvatac 115NS (a product of Arizona Chemical, Sylvachem Division, identified as a polyester derived from pentaerythritol and rosin acid having a softening point of 110° C. and a molecular weight of about 1270). The thermoplastic polymeric material (B) is preferably present in the inventive coating composition at a level in the range of about 35% to about 65% by weight, more preferably about 40% to about 50% by weight.

The pigment (C) can be any pigment known in the art. Examples include titanium dioxide, carbon black, chrome green, antimony yellow, antimony orange, antimony oxide, iron oxide (natural or synthetic), cobalt blue, phthalo blue, phthalo green, azo red, diarylide yellow, etc. Mixtures of two or more of such pigments can be used. Pigment (C) is present in the inventive coating compositions at a sufficient level to provide the desired degree of color and/or opacity. The amount of pigment is dependent upon the color shade desired. In one embodiment, pigment (C) is employed at a level in the range of about 1% to about 40% by weight, and in another embodiment it is employed at a level of about 5% to about 25% by weight.

Wax (D) can be any wax having a melting point in the range of about 40° C. to about 110° C., more preferably about 60° C. to about 100° C. These include animal waxes such as beeswax, spermaceti, lanolin or shellac wax; vegetable waxes such as carnauba, candelilla, bayberry or sugarcane; mineral waxes such as ozocerite, ceresin or montan; petroleum waxes such as paraffin, microcrystalline, petrolatum, slack wax or scale wax; synthetic waxes such as ethylenic polymers or polyol ether-esters (e.g., sorbitol and the Carbowax products of Union Carbide identified as polyethylene glycols and methoxypolyethylene glycols); chlorinated naphthalenes; hydrocarbon waxes made via Fischer-Tropsch synthesis. Wax (D) is preferably present in the inventive coating composition at a level in the range of up to about 30% by weight, more preferably about 2% to about 15% by weight.

The silicone polymers (E) contain repeating silicon-oxygen backbones and typically have one or more organic groups attached to a significant proportion of the silicon atoms by silicon-carbon bonds. These organic groups typically include methyl, longer chain alkyl groups (e.g., 2 to about 7 carbon atoms), fluoroalkyl groups, phenyl, vinyl, etc. The silicon atoms can also have hydrogen, chlorine, alkoxy acyloxy, alkyl amino groups, etc., attached thereto. These polymers include linear, branched and cross-linked structures. Examples of useful silicone polymers include polydimethyl siloxane, polymethylvinyl siloxane, polymethylphenyl siloxane, polydiphenyl siloxane, etc. Copolymers made by combining different siloxane units can be used. Examples include copolymers of polydimethyl siloxane with polymethylvinyl siloxane, polymethylphenyl siloxane, polydiphenyl siloxane, etc. Mixtures of two or more of these silicone polymers can be used. Examples of commercially available silicone polymers that are useful include those marketed by General Electric under the trade designation SR882M. The silicone polymers (E) are preferably present in the inventive coating compositions at a level in the range of up to about 5% by weight, more preferably about 1% to about 2% by weight.

The fluorocarbon polymers (F) comprise polymers derived from monomers containing one or more atoms of fluorine or copolymers of such monomers, the fluorine-containing monomers being in the greatest mass. Examples include polytetrafluoroethylene, fluorinated ethylene-propylene, polychlorotrifluoroethylene, polyvinylidene fluoride, polyhexafluoropropylene, etc. Mixtures of two or more of such fluorocarbon polymers can be used. These fluorocarbon polymers preferably have number average molecular weights in the range of about one million to about 20 million. The melting point of these fluorocarbon polymers preferably ranges from about 450° F. to about 650° F., more preferably about 550° F. to about 650° F. These fluorocarbon polymers are preferably present in the inventive coating compositions at a level in the range of up to about 6% by weight, more preferably about 1% to about 5% by weight, more preferably about 3.5% to about 4.5% by weight.

The plasticizer (G) is preferably a low-melting (i.e., melting temperature in the range of about 0° C. to about 50° C.) solid or liquid. Examples include aliphatic polymeric resins such as polybutene; and phthalate, adipate and sebacate esters of polyols such as ethylene glycol and its derivatives, etc. Examples of commercially available plasticizers that are useful include Hercoflex 500 (a product of Hercules identified as an aliphatic resin) and Indopol 14 (a product of Amoco identified as a polybutene). The plasticizers (G) are preferably present in the inventive coating composition at a level of up to about 10% by weight, more preferably about 1% to about 6% by weight.

The surfactants (H) are preferably of the nonionic type. Many such surfactants are known to the art. See, for example, McCutcheon's "Emulsifiers & Detergents", 1983, North American Edition, pp. 61–299, and International Edition, pp. 1–225, published by McCutcheon Division, MC Publishing Co., Glen Rock, N.J., U.S.A.; these pages being incorporated herein by reference. These surfactants include the alkylene oxide-treated products, such as ethylene oxide-treated phenols, alcohols, esters, amines and amides. Ethylene oxide-propylene oxide block copolymers are also useful nonionic surfactants. Glycerol esters and sugar esters are also known to be nonionic surfactants. An example of a commercially available surfactant that is useful is Perenol GL12 (a product of Herkol identified as a mixed fatty acid ester). Many other suitable nonionic surfactants are known; see, for example, the aforementioned McCutcheon's as well as the treatise "Non-Ionic Surfactants" edited by Martin J. Schick, M. Dekker Co., New York, 1967, which is hereby incorporated by reference for its disclosures in this regard. These surfactants are preferably employed at a sufficient level to enhance the dispersion of the pigment (D) in the inventive coating composition. The surfactant (H) is preferably employed in the inventive coating composition at a level in the range of up to about 3% by weight, preferably about 1% to about 2% by weight.

The organo silanes (I) can be represented by the formula

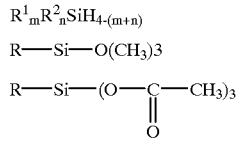

wherein $R^1$ is an alkoxy group of up to about 4 carbon atoms or an aryloxy group of up to about 10 carbon atoms; $R^2$ is an aliphatic or an alicyclic group of up to about 8 carbon atoms or an aromatic group of up to about 12 carbon atoms; and m and n are independently numbers in the range of 1 to 3. $R^1$ can be methoxy, ethoxy, propoxy, butoxy, phenoxy, tolyloxy, xyloxy, etc. $R^2$ can be vinyl, propenyl, isopropenyl, acrylic, methacrylic, ethylacrylic, butenyl, isobutenyl, vinylene, benzyl, propylene-substituted benzyl, butylene-substituted benzyl, vinylene-substituted tolyl, methyl, ethyl, propyl, isopropyl, butyl, isobutyl, phenyl, benzyl, tolyl, xylyl, etc. Examples of useful silanes include gamma-methacryloxypropyltrimethoxysilane; 3,4-epoxycyclohexylethyltrimethoxysilane; and gammaglycidoxypropyltrimethoxysilane. These silanes are preferably present in the inventive coating compositions at levels of up to about 3% by weight, more preferably about 0.5% to about 1% by weight.

An adhesion promoter (J) is optionally added to the composition of the present invention depending on the substrate to be coated or printed, the end use of the substrate or article and such other considerations. An adhesion promoter is preferably added to the coating composition when the substrate to be printed is glass. A preferred adhesion promoter material is a low molecular weight, non-reactive, epoxy resin capable of melt flow at the temperatures of printing. Exemplary of such materials are epoxy resins sold under the trade name EPOTUFF® by Reichold Chemicals Inc.

The inventive coating compositions can include at least one dye. Any dye known in the art can be used, the particular dye and level of use being dependent upon the desired color. Mixtures of two or more of such dyes can be used.

While the inventive coating compositions comprise basically the components just described, it is understood that still other components may be added in amounts as needed to modify the physical characteristics of such compositions, such as flow properties, print definition, etc., or reduce their cost. For example, particulate calcium carbonate and/or colloidal silica may be incorporated as thixatropes or fillers.

The thermoplastic (A) and (B) polymers of the coating compositions of the present invention necessarily need to be capable of melt flow at printing temperatures. Therefore, the combined (A) and (B) polymers must have a minimal viscosity or flow upon heating to printing temperatures while not undergoing thermal degradation at these temperatures. The coating compositions of the present invention including the (A) and (B) polymers should generally be solid at or about room temperature and a liquid at about 200° F. to about 300° F. wherein the invention composition exhibits a viscosity between about 5,000 cps to about 100,000 cps at about 200° F. to about 300° F. and more preferably a viscosity of about 5,000 cps to about 80,000 cps at about 200° F. to about 300° F. and most preferably a viscosity of about 10,000 cps to about 50,000 cps at about 200° F. to about 300° F. An ideal viscosity for the coating composition of the present invention is approximately 18,000 cps at 260° F. For the purposes of the present invention, the viscosity for the compositions of the present invention was measured by using ASTM D2196-86 modified by using a T-B spindle and a sample temperature between 200° F. and 300° F.

The inventive coating compositions are preferably prepared by first melting the resin and wax components at a temperature in the range of about 80° C. to about 150° C., more preferably about 105° C. to about 135° C. These materials are mixed with low-speed agitation on a disperser until homogeneous. The pigments and other additives, if used, are then introduced into the mixture with low-speed agitation. The speed of the disperser is then increased in order to disperse the pigment and additive agglomerates. The mixture is then preferably agitated for approximately one hour at a temperature of about 110° C. to about 150° C. The mixture is then cooled to solid form (preferably at a temperature below about 40° C.) and packaged.

Application of the inventive coating compositions is preferably effected by squeegeeing the coating composition through a heated screen of fine metal wires onto a substrate. Preferably the inventive coating compositions are heated to a temperature in the range of about 70° C. to about 135° C., more preferably about 90° C. to about 120° C., prior to application to the substrate. The screen may be electrically heated and/or the coating composition can be maintained fluid by radiant burners. The screen can be blocked or masked so that the coating composition passing through the screen is applied to the substrate in a predetermined pattern. Various substrates of glass, ceramic, metal, plastic, fiberboard or textile, etc., may be coated or printed by the present process. Once applied to the substrate the coating composition is preferably cooled to a temperature in the range of about 10° C. to about 40° C. in preferably less than about one second. The ware being processed can be in the form of bottles or tumblers. The inventive coating compositions are particularly adapted for screen printing disposable, throwaway containers, such as bottles or jars made of glass, polyethylene, polypropylene, polyvinyl chloride, and the like. The applied coatings or prints can be subsequently polished by heating the applied coating or print to increase its gloss and/or smoothness, improve its adhesion to the substrate, and/or remove lingering solvents. Such heating can be effected by placing a flame over the applied coating or print for a few seconds (e.g., about 2 to about 6 seconds) or subjecting the applied coating or print to high-velocity hot air or radiant heat using known techniques.

In order to further illustrate the invention, the following examples of preferred formulations are provided. Unless otherwise indicated, in the following examples as well as throughout the entire specification and in the appended claims, all parts and percentages are by weight, and all temperatures are in degrees centigrade.

EXAMPLE 1

| | Parts/Wt. |
|---|---|
| Zonarez 7115 (product of Arizona Chemical identified as a polyterpene having a melting point of 115° C.) | 65 |
| Elvax 220 (product of Dupont identified as an ethylene-vinyl-acetate copolymer having a vinyl acetate content of 28% by weight and a melt index of 150) | 20 |
| Titanium Dioxide | 15 |

EXAMPLE 2

| | Parts/Wt. |
|---|---|
| Zonarez 7125 (product of Arizona Chemical identified as a polyterpene having a melting point of 125° C.) | 41.43 |
| Ultrathene UE 654-35 (product of Quantum Chemical identified as an ethylene vinyl acetate copolymer having a 33% by weight vinyl acetate content and a melt index of 43) | 12.43 |
| Ultrathene UE 653-35 (product of Quantum Chemical identified as an ethylene vinyl acetate copolymer having a 28% by weight vinyl acetate content and a melt index of 388) | 8.29 |
| Ross Wax 100 (product of Frank B. Ross Co., Inc. identified as a Fischer-Tropsch wax having a congealing point of 200–210° F. as determined by ASTM D938) | 4.71 |
| Shamrock S195 (product of Shamrock Technologies identified as a polyethylene wax having a melting point of | 4.71 |

-continued

| | Parts/Wt. |
|---|---|
| 92° C.) | |
| General Electric SR882M (product of General Electric identified as a silicone polymer) | 1.13 |
| Shamrock SST2 (product of Shamrock Technologies identified as polytetrafluoroethylene) | 3.77 |
| Titanium Oxide, as a pigment | 23.53 |

EXAMPLE 3

| | Parts/Wt. |
|---|---|
| Acryloid B-72 (product of Rohm & Haas, identified as an ethyl methacrylate copolymer with a glass transition temperature of 40° C.) | 30 |
| Piccolastic A-75 (product of Hercules, Inc., identified as a polystyrene of low molecular weight, 300–400, and a softening point of about 75° C. by the ring and ball method) | 40 |
| Piccolastic A-5 (product of Hercules, Inc., identified as a polystyrene of low molecular weight, 300–400, and a softening point of about 5° C. by the ring and ball method) | 10 |
| Aerosil R-972 (product of Degussa, identified as a fumed silica) | 2 |
| Titanium Dioxide, as a pigment | 18 |

EXAMPLE 4

| | Parts/Wt. |
|---|---|
| B-82 Acrylic (A product of Rohm and Haas identified as a methyl methacrylate copolymer with a glass transition temperature (Tg) of 35° C.) | 20 |
| Epotuff 37-002 (product of Reichold Chemicals Inc., identified as a nonreactive, low molecular weight epoxy resin and melting point of 220° C.) | 20 |
| Piccolastic A-75 (product of Hercules, Inc., identified as a polystyrene of low molecular weight, 300–400, and a softening point of about 75° C. by the ring and ball method) | 20 |
| Piccolastic A-5 (product of Hercules, Inc., identified as a polystyrene of low molecular weight, 300–400, and a softening point of about 5° C. by the ring and ball method) | 20 |
| Titanium Dioxide | 15 |
| Aerosil R-972 (product of Degussa, identified as a fumed silica) | 2 |
| DC-200 (product of Dow) | 1 |
| Shamrock SST2 (product of Shamrock Technologies identified as polytetrafluoroethylene) | 2 |

EXAMPLE 5[1]

| | Parts/Wt. |
|---|---|
| B-82 Acrylic (A product of Rohm and Haas identified as a methyl methacrylate copolymer with a glass transition temperature (Tg) of 35° C.) | 20 |
| Epotuff 37-002 (product of Reichold Chemicals Inc., identified as a nonreactive, low molecular weight epoxy resin and melting point of 220° C.) | 20 |
| Piccolastic A-75 (product of Hercules, Inc., identified as a polystyrene of low molecular weight, 300–400, and a softening point of about 75° C. by the ring and ball method) | 20 |
| Piccolastic A-5 (product of Hercules, Inc., identified as a polystyrene of low molecular weight, 300–400, and a softening point of about 5° C. by the ring and ball method) | 25 |
| PC 9673 deep red (Daniels) | 5 |
| Aerosil R-972 (product of Degussa, identified as a fumed silica) | 3 |
| Titanium Dioxide | 1 |
| DC-200 (product of Dow) | 1 |
| Shamrock SST2 (product of Shamrock Technologies identified as polytetrafluoroethylene) | 2 |
| Red Iron Oxide 297 (product of Columbian Chemical) | 3 |

[1] The color of the composition is very close to Ceramic "Parisian Red".

EXAMPLE 6

A piece of glassware is printed with the composition of Example 2 according to the following process.

1) Melt the thermoplastic polymeric material at a temperature of between 200° F. to about 300° F.
2) Place a small amount of melted material onto an electrically heated wire screen. (100–325 U.S. mesh) This screen is masked such that the coating will be deposited as a design on the ware.
3) The ware is decorated by pushing the heated thermoplastic polymeric material through the screen, (at temperatures of about 180° F. to about 300° F.) by means of a squeegee.
4) The heated material will immediately "freeze" on the relatively cool ware allowing successive colors to be applied.
5) The decorated ware is then heated to a temperature of between 250° F. to 500° F. to allow it to reflow and obtain a glossy surface and better adhesion.
6) The ware is allowed to cool and is removed from the production line for storage or shipment.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

What is claimed is:

1. A printing coating composition for forming a decorative coating on a substrate comprising:
   (A) (i) at least one homopolymer of ethylene having a melt index of at least about 220 grams per ten minutes as determined by ASTM D1238, condition 190/2.16, or (ii) at least one copolymer of ethylene and a second ethylenically unsaturated monomer having a melt index of at least about 20 grams per ten minutes as determined by ASTM D1238, condition 190/2.16, or (iii) at least one thermoplastic acrylic homopolymer or copolymer having a glass transition temperature (Tg) of greater than 0° C. but less than 110° C., or (iv) a mixture of (i), (ii) and (ii);

(B) at least one thermoplastic polymeric material different than (A) having a melting point in the range of about 0° C. to about 130° C. and being dispersible with (A) wherein the polymer composition of (A) and (B) is normally solid at room temperature but is a viscous liquid at about 200° F. to about 300° F. having a viscosity in the range of about 5,000 cps to about 100,000 cps; and (C) an adhesion promoter, said adhesion promoter comprising an epoxy resin.

2. The composition of claim 1 wherein said adhesion promotor (C) is a low molecular weight epoxy adhesion promoter.

3. A substantially solvent-free printing coating composition for forming a decorative coating on a substrate comprising:

(A) at least one copolymer of ethylene and a second ethylenically unsaturated monomer having a melt index of at least about 20 grams per ten minutes as determined by ASTM D1238, condition 190/2.16;

(B) at least one thermoplastic polymeric material different than (A) having a melting point in the range of about 0° C. to about 130° C. and being dispersible with (A) wherein the polymer composition of (A) and (B) is normally solid at room temperature but is a viscous liquid at about 200° F. to about 300° F. having a viscosity in the range of about 5,000 cps to about 100,000 cps;

(C) an adhesion promoter, said adhesion promoter comprising an epoxy resin; and (D) at least one pigment.

* * * * *